United States Patent [19]
Borah

[11] Patent Number: 5,821,211
[45] Date of Patent: Oct. 13, 1998

[54] DE-SCALING SOLUTION AND METHODS OF USE

[75] Inventor: Ronald E. Borah, Chesterton, Ind.

[73] Assignee: Active Environmental Technologies, Inc., Mount Holly, N.J.

[21] Appl. No.: 862,099

[22] Filed: May 22, 1997

Related U.S. Application Data

[63] Continuation-in-part of Ser. No. 711,397, Sep. 6, 1996, Pat. No. 5,728,660, and a continuation of Ser. No. 222,469, Apr. 4, 1994, abandoned, and a continuation-in-part of Ser. No. 43,435, Apr. 5, 1993, Pat. No. 5,421,906.

[51] Int. Cl.$^6$ ....................................................... C02F 5/08
[52] U.S. Cl. ............................................. 510/247; 510/110
[58] Field of Search ..................................... 510/110, 247, 510/253

[56] References Cited

U.S. PATENT DOCUMENTS

| | | | |
|---|---|---|---|
| 5,354,383 | 10/1994 | Bianchi | 134/3 |
| 5,480,627 | 1/1996 | Takei et al. | 430/127 |
| 5,523,000 | 6/1996 | Falbaum et al. | 210/708 |

*Primary Examiner*—Paul Lieberman
*Assistant Examiner*—John R. Hardee
*Attorney, Agent, or Firm*—Christensen O'Connor Johnson Kindness PLLC

[57] ABSTRACT

De-scaling solution comprising about 5 wt. % to about 25 wt. % nitric acid, about 0.1 wt. % to 1 wt. % phosphoric acid, about 0.5 wt. % to about 9 wt. % hydrogen peroxide, about 2 wt. % to about 12 wt. % surfactant and the balance water, preferably deionized. Optionally, a catalyst such as $NiCl_2$ or $FeCl_2$ may be added to the solution.

21 Claims, No Drawings

DE-SCALING SOLUTION AND METHODS OF USE

RELATED APPLICATIONS

This application is a continuation-in-part of U.S. Pat. No. 5,728,660, filed on Sep. 6, 1996, which is in turn a continuation of U.S. application No. 08/222,469, filed on Apr. 4, 1994 (abandoned), which is in turn a continuation-in-part of U.S. Pat. No. 5,421,906, filed on Apr. 5, 1993.

FIELD OF THE INVENTION

The invention is of a cleaning process and cleaning compositions effective for the removal of scales, which may contain a variety of minerals, radioactive contaminants and heavy metals.

BACKGROUND OF THE INVENTION

Scales often build-up on metallic pipes, resulting in weakening of the structural integrity of the pipes, reduction in cross-sectional area for flow through the pipes and even contamination of fluid flowing through the pipes. Such scales may also occur on other process equipment, including tanks and vessels, which come into contact with the material that causes scale formation. While the more common types of scales comprise mineral deposits, such as calcium sulfate and magnesium silicate, other scales may include substantially more hazardous substances, such as radionucleides. Accordingly, removal of scales is important not only to protect process equipment, but also for reduction of the concentration of toxic or hazardous materials to allow safe disposal or reuse of equipment.

While scales are commonly thought of as a surface deposit, covering only the outer surface of a substrate that is regarded conventionally as "non-porous," in fact, certain scales penetrate into the underlying substrate. Even conventionally non-porous surfaces, such as metal surfaces, contain pores and irregularities at grain boundaries into which scale chemicals penetrate and lodge. Moreover, surfaces often present a certain degree of roughness and scale chemicals lodge within these rough or irregular surfaces, resisting removal by mechanical and even chemical means. This problem is particularly acute when the scale components contain a hazardous component, such as radionucleides, PCBs and other chemicals that pose an environmental or health hazard, as determined by the U.S. Environmental Protection Agency (EPA) and the Nuclear Regulatory Agency (NRC). In the case of radionucleides, to qualify as decontaminated, depending upon the type of radioactivity, the NRC requires that the level of radioactivity from radionucleides be reduced to less than 5,000 disintegrations per minute (DPM) in some cases and other lower levels in other cases. The EPA has similar guidelines for the allowable residual concentration of other hazardous or toxic materials in order to qualify as decontaminated.

There exists a need for means for cleaning surfaces of contaminants, particularly hardened scales and especially scales that contain hazardous or radioactive components, without generating significant amounts of additional hazardous waste that pose a disposal problem. Moreover, there is a need for the removal of these contaminants from surfaces without damaging the underlying substrates, so that process equipment for example can be reused. Furthermore, the cleaning means should be able to remove contaminants lodged in surface irregularities and between grain boundaries of a metallic substrate so that contaminated equipment and other objects meet regulatory guidelines for being reclassified as decontaminated and suitable for reuse or disposal.

SUMMARY OF THE INVENTION

The invention provides a water-based ("aqueous"), non-flammable cleaning fluid and methods for applying the fluid for the removal of mineral deposits or "scales," from surfaces and substrates of all kinds. The de-scaling solution of the present invention is a blend of chemicals in water and has a pH in the acid range. While the de-scaling solution may be used in conjunction with other cleaners for many other purposes, it is effective by itself for removal of most industrial and hazardous material scales. The solution preferably comprises about 5 wt. % to about 25 wt. % nitric acid, about 0.1 wt. % to about 1 wt. % phosphoric acid, about 0.5 wt. % to about 9 wt. % hydrogen peroxide, about 2 wt. % to about 12 wt. % surfactant and the balance water, preferably deionized. Most preferably, the solution includes about 20 wt. % of 36° Baume nitric acid, about 0.5 wt. % phosphoric acid, about 3 wt. % of a 35 percent solution of hydrogen peroxide and about 10 wt. % of a phosphate acid ester surfactant. Optionally, sulfuric acid of about 1 wt. % to about 10 wt. % concentration and most preferably 60° Baume sulfuric acid (of about 3 wt. %) can be included.

Since the de-scaling blends are water-based, it is preferred that the water used in making the de-scaling blends be distilled, deionized, demineralized or be subjected to some other process that significantly reduces the concentration of any ions in the water that may interfere with de-scaling action.

The de-scaling solution of the present invention is able to penetrate into surface pores, surface irregularities and between grain boundaries of metallic surfaces to permit deep cleaning of not only the surface, but also the underlying substrate. This cleaning is achieved without mechanical scouring and gouging or other removal of the surface from the substrate being cleaned, so that surface modification or damage is minimized.

Methods of applying the de-scaling solutions of the invention include high pressure spraying onto scale surfaces, soaking in the de-scaling solution (in conjunction with or followed by mechanical scrubbing without surface damage) and circulation of the de-scaling solution through process equipment until the desired degree of cleaning has been achieved.

The de-scaling compositions utilized are not flammable and the waste generated during cleaning generally constitutes less than about 7–8 gallons/100 ft$^2$ of surface cleaned. Therefore, waste disposal costs are minimized.

The de-scaling solutions and methods of the invention can decontaminate radionucleide contaminated materials to less than the NRC-required 5,000 DPM standard. Materials contaminated with heavy metals, herbicides or pesticides can be cleaned to meet or better the EPA's current TCLP standards. Thus, the de-scaling solutions can clean PCB-contaminated surfaces to meet the current EPA standard of less than 10 micrograms/100 cm$^2$ to allow reclassification from a hazardous material to a non-hazardous material; and to less than 0.2 micrograms/100 cm$^2$ to allow reuse or resale of the cleaned articles.

DETAILED DESCRIPTION OF THE PREFERRED EMBODIMENTS

The De-scaling Solution

The invention de-scaling blends are water-based and, to prevent interference from ions normally present in a typical water supply, it is preferred that the water be distilled, deionized or demineralized to remove or otherwise neutralize potentially interfering ions and produce substantially ion-free water. As a precaution, it is also recommended that any rinsing or washing with water should likewise be carried out with water that is substantially ion-free.

Without being bound by any theory, it is hypothesized that the invention process and cleaning solutions may perform their function by electrochemical processes based on the ionic species present in the solutions. Contaminants migrate into the surface and become electrostatically bonded to the negatively charged substrate. The de-scaling solutions react electrochemically with contaminants to solubilize or leach out the contaminants. It is believed that a surfactant in the de-scaling solution allows for greater penetration into the substrate.

While the invention focuses on the de-scaling solution as a stand-alone cleaning agent, it is also useful in conjunction with other cleaners in a multi-step process for cleaning of surfaces of all kinds contaminated with hazardous materials. The de-scaling solution of the present invention may also be used as a "preflush solution" in a multi-step process, such as the processes described in our applications, hereby incorporated by reference in pertinent part, U.S. Ser. No. 08/222,469 (filed Apr. 4, 1994) and continued in U.S. Ser. No. 08/711,397 filed Sep. 6, 1996, now U.S. Pat. No. 5,728,660. When used as a preflush solution, the basic cycle is to first soak the objects to be cleaned in the solution, then precleaning by scrubbing with another precleaning fluid. The precleaning fluid is allowed to dwell for a certain time, as needed and then rinsed off followed by vacuuming and applying of extraction fluid. The extraction fluid is allowed to dwell on the surface for a period of time then rinsed off. Thereafter, the surface is vacuumed, usually followed by at least one further application of the extraction fluid to the surface. The extraction, rinsing and vacuuming steps are and repeated until the desired level of residual contaminants is achieved, as explained in the patent.

The de-scaling solution according to the invention is an aqueous solution with a pH less than 1. The de-scaling solution facilitates the action of extraction. As shown in examples 1, 3–8 and 10–13, the de-scaling solution can function as a stand-alone composition for dissolution of a scale. When the term "de-scaling solution" is used, it should be understood to include solutions within the scope of the subject invention that are also useful for removing other contaminants in a scale, including radionucleides and heavy metals.

In its most basic but useful form, the de-scaling solution comprises a strong oxidizing acid and a surfactant dissolved in deionized water. The composition preferably comprises about 5 wt. % to about 25 wt. % nitric acid, about 0.1 wt. % to about 1 wt. % phosphoric acid, about 0.5 wt. % to about 9 wt. % hydrogen peroxide, about 2 wt. % to about 12 wt. % surfactant, preferably an ester and the balance water, preferably deionized. All wt. % are based on the total weight of the solution, i.e., the chemical components and water. Most preferably about 20 wt. % of about 36° Baume nitric acid, about 0.5 wt. % phosphoric acid, about 3 wt. % of a 35 percent solution of hydrogen peroxide and about 10 wt. % of a phosphate acid ester surfactant are employed. Optionally, sulfuric acid of about 1 wt. % to about 10 wt. % and most preferably about 60° Baume sulfuric acid of about 3 wt. %, can be included.

It is believed the solution of the invention is an oxidizer which oxidizes a wide variety of elements and compounds, thereby enabling the renewal of heretofore insoluble scale constituents from surfaces. It is believed that through oxidation the valence state and solubility of the scale constituent is changed so that it can be solubilized and removed. Nitric acid, hydrogen peroxide, phosphoric acid and sulfuric acid are all oxidizers, with each being effective for removing or solubilizing a particular group of compounds. A broad spectrum of scale contaminants is thus removed by combining these oxidizers in the de-scaling solution of the invention.

Additionally, it is believed that nitric acid functions as a sequestering agent in the de-scaling solutions. Nitric acid also causes the normally volatile hydrogen peroxide to remain in solution so that its oxidative qualities can be harnessed. In order to counteract the volatile oxidation by nitric acid, which may damage some metals and to prevent the evolution of combustible hydrogen gas, the solution is buffered by the surfactant. The surfactant, which is preferably an ester and most preferably phosphoric acid ester, also functions as a hydrotope and a wetting agent to improve penetration into porous substances or irregular surfaces, if the scaled substrate has such a surface. The ester family is preferred because it is not compromised by nitric acid and is believed to control the aggressive action of this acid.

Preferred Methods for Using the De-scaling Solutions of the Invention

Methods for de-scaling surfaces may vary depending upon the nature of the equipment or materials being cleaned. However, as a general principle, the scale surface is exposed to the de-scaling solutions of the invention for a sufficient time to allow dissolution of the scale and penetration of the solution into any surface irregularities, pores or grain boundaries contaminated with the scale. Thus, the de-scaling solution must be allowed to dwell on the scale surface for a sufficient length of time to allow dissolution and extraction of scale components from the surface. Clearly, the rate of cleaning, being a chemical process, is also temperature dependent. Thus, at higher temperatures faster cleaning may be achieved. However, it is preferred that temperatures should be maintained in the range from about 40° to about 65° C. Moreover, scale-contaminated equipment may be de-scaled in pressure vessels containing the de-scaling solution. Under these conditions, temperature and pressure should be regulated to minimize damage of the surface from chemical attack. It is preferred that the de-scaling solution dwell on the scale contaminated surfaces at ambient pressure, for most cleaning applications.

As indicated above, the rate of cleaning can be accelerated by the addition of a catalyst selected from nickel chloride and iron chloride, doped in appropriate quantity into the de-scaling solution. The use of such catalyst significantly reduces any need for elevated temperatures or pressures to increase the rate of scale removal. The catalyst may be added at a rate of about 1 to about 5 wt %, preferably about 3wt%.

As indicated above, the de-scaling solution can be applied in a variety of ways to scale-contaminated surfaces. In the case of pipelines contaminated with an interior scale, a preferred method is to supply the de-scaling solution under pressure to a "mechanical mole" equipped with sprayers which is traversed along the interior length of the pipe, spraying solution under pressure onto the scale-contaminated surfaces. The sprayed solution is allowed to dwell on the pipes for a sufficient time to dissolve and leach out scale. Thereafter, the pipe interiors are rinsed and inspected. If necessary, the pressure spraying process can be repeated, until the desired degree of cleaning has been achieved.

In the case of other scale-contaminated equipment, the equipment may be submerged in a tank of de-scaling solution for a sufficient time to dissolve and leach out scale from surfaces. In certain circumstances, mechanical agitation of the scale solution may facilitate the scale dissolution process. Also, periodic removal of the equipment from the solution and the application of mechanical scrubbing (or other physical treatment that does not appreciably scour, scar or damage the surface) followed by resoaking may also facilitate scale removal. After scale removal, the equipment may be rinsed in water, inspected, and resoaked if further cleaning is desired.

For certain kinds of chemical process equipment, the de-scaling solution of the invention may be circulated throughout the equipment on a continuous basis until the desired level of cleaning has been achieved. During the circulation, fresh make-up de-scaling solution may be added, as contaminated or "spent" solution is removed. The equipment may be inspected periodically by shutting off the supply of de-scaling solution and rinsing with water by circulating water through the equipment.

The following examples are intended to illustrate certain embodiments of the invention and do not in any way limit the scope of the invention as described above and claimed below.

EXAMPLES

Each of the following examples (except comparative Examples 2 and 9) uses a de-scaling solution of the invention to dissolve a pipe scale. The scales used in the examples 1–12 are oil field pipe interior scales that contained mainly barium sulfate, calcium sulfate and magnesium silicate. In the examples the de-scaling solution blend, dissolution time and temperature are variables.

Example 1

The scale sample weighed 0.5570 grams and was placed in a de-scaling solution of the invention having a temperature of 60° C. for 120 minutes. 100 percent dissolution of the scale sample occurred. The de-scaling solution had the following composition:

| Chemical | Weight Percent |
| --- | --- |
| Nitric acid | 20.0 |
| Phosphoric acid | 0.3 |
| Hydrogen peroxide | 3.0 |
| Phosphate acid ester | 9.7 |
| Deionized water | 67.0 |

Example 2(Comparative)

The scale sample weighed 0.2116 grams and was placed in the water having a temperature of 60° C. for 120 minutes. Only 17.8 percent dissolution of the scale sample occurred.

Example 3

The scale sample weighed 0.4152 grams and was placed in a de-scaling solution having a temperature of 60° C. for 30 minutes. 100 percent dissolution of the scale sample occurred. The de-scaling solution had a chemical composition:

| Chemical | Weight Percent |
| --- | --- |
| Nitric acid | 20.0 |
| Phosphoric acid | 0.3 |
| Hydrogen peroxide | 3.0 |
| Phosphate acid ester | 9.7 |
| Deionized water | 67.0 |

Example 4

The scale sample weighed 0.3979 grams and was placed in a de-scaling solution having a temperature of 60° C. for 10 minutes. 60.3 percent dissolution of the scale sample occurred. The de-scaling solution had the following composition:

| Chemical | Weight Percent |
| --- | --- |
| Nitric acid | 20.0 |
| Phosphoric acid | 0.3 |
| Hydrogen peroxide | 3.0 |
| Phosphate acid ester | 9.7 |
| Deionized water | 67.0 |

Example 5

The scale sample weighed 0.3482 grams and was placed in a de-scaling solution having a temperature of 60° C. for 10 minutes. 59.1 percent dissolution of the scale sample occurred. The de-scaling solution had the following composition:

| Chemical | Weight Percent |
| --- | --- |
| Nitric acid | 25.0 |
| Phosphoric acid | 0.3 |
| Hydrogen peroxide | 3.0 |
| Phosphate acid ester | 9.7 |
| Deionized water | 62.0 |

Example 6

The scale sample weighed 0.5359 grams and was placed in a de-scaling solution having a temperature of 60° C. for 10 minutes. 40.6 percent dissolution of the scale sample occurred. The de-scaling solution, diluted 4:1 in deionized water, had the following composition:

| Chemical | Weight Percent |
| --- | --- |
| Nitric acid | 4.00 |
| Phosphoric acid | 0.006 |
| Hydrogen peroxide | 0.600 |
| Phosphate acid ester | 1.940 |
| Deionized water | 93.454 |

Example 7

The scale sample weighed 0.4400 grams and was placed in a de-scaling solution having a temperature of 60° C. for 10 minutes. 28.7 percent dissolution of the scale sample occurred. The de-scaling solution had the following composition:

| Chemical | Weight Percent |
| --- | --- |
| Nitric acid | 20.0 |
| Phosphoric acid | 0.3 |
| Hydrogen peroxide | 3.0 |
| Phosphate acid ester | 9.7 |
| Sulfuric acid | 3.0 |
| Deionized water | 64.0 |

Example 8

The scale sample weighed 0.4279 grams and was placed in a de-scaling solution having a temperature of 60° C. for 10 minutes. 20.2 percent dissolution of the scale sample occurred. The de-scaling solution had the following composition:

| Chemical | Weight Percent |
| --- | --- |
| Nitric acid | 20.0 |
| Phosphoric acid | 0.3 |
| Hydrogen peroxide | 3.0 |
| Phosphate acid ester | 9.7 |
| Sulfuric acid | 10.0 |
| Deionized water | 57.0 |

Example 9(Comparative)

The scale sample weighed 0.1925 grams and was placed in water having a temperature of 60° C. for 10 minutes. 7.9 percent dissolution of the scale sample occurred.

Example 10

The scale sample weighed 0.2222 grams and was placed in a de-scaling solution having a temperature of 60° C. for 10 minutes. 84.7 percent dissolution of the scale sample occurred. The de-scaling solution had the following composition:

| Chemical | Weight Percent |
| --- | --- |
| Nitric acid | 20.0 |
| Phosphoric acid | 0.3 |
| Hydrogen peroxide | 3.0 |
| Phosphate acid ester | 9.7 |
| Deionized water | 64.0 |
| Hydrogen peroxide | 3.0 |

Example 11

The scale sample weighed 0.2268 grams and was placed in a de-scaling solution having a temperature of 60° C. for 10 minutes. 74.5 percent dissolution of the scale sample occurred. The de-scaling solution had the following composition:

| Chemical | Weight Percent |
| --- | --- |
| Nitric acid | 20.0 |
| Phosphoric acid | 0.3 |
| Hydrogen peroxide | 3.0 |
| Phosphate acid ester | 9.7 |
| Deionized water | 67.0 |

Example 12

The scale sample weighed 0.3266 grams and was placed in a de-scaling solution having a temperature of 60° C. for 10 minutes. 58.7 percent dissolution of the scale sample occurred. The de-scaling solution had the following composition:

| Chemical | Weight Percent |
| --- | --- |
| Nitric acid | 20.0 |
| Phosphoric acid | 0.3 |
| Hydrogen peroxide | 3.0 |
| Phosphate acid ester | 9.7 |
| Hydrogen peroxide | 10.0 |
| Deionized water | 57.0 |

Example 13

A de-scaling solution was prepared in accordance with the invention by combining 20 wt. % nitric acid, 0.3 wt. % phosphoric acid, 0.5 wt. % hydrogen peroxide, 9.7 wt. % phosphate acid ester; and the remainder deionized water. This control solution, doped with three different levels of nickel chloride catalyst, was then used to de-scale pieces of metal, to observe the effectiveness of the catalyst. In each case, the scaled metal pieces were immersed in a bath of de-scaling solution maintained at approximately 80° F., for a period of between five and seven minutes. The effectiveness of the catalyst was evaluated by observing the degree of scale removal achieved relative to the wt. % catalyst in the solution. As can be seen from the results tabulated below, adding 3% nickel chloride improves oxide removal to 98%, from 20% removal in the control without catalyst. Adding 5 wt. % nickel chloride may result in an overly aggressive solution, since pitting of the underlying substrate commences.

| Weight Percent Nickel Chloride | Comments |
| --- | --- |
| 0 | This is a control, 20% of the oxide layer was removed. |
| 1 | Approximately 30% oxide removal. |
| 3 | Brightening of base metal, 98% oxide removal. |
| 5 | Total oxide removal and commencement of pitting of the underlying metal. |

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A solution for removing contaminants from surfaces, the solution comprising dissolved in water, the following components:
   (a) about 5 wt. % to about 25 wt. % nitric acid;
   (b) about 0.1 wt. % to about 1 wt. % phosphoric acid;
   (c) about 0.5 wt. % to about 9 wt. % hydrogen peroxide;
   (d) about 2 wt. % to about 12 wt. % surfactant; and
   (e) the balance water.

2. The solution of claim 1 wherein the water is deionized.

3. The solution of claim 1 further comprising:
   about 1 wt. % to about 10 wt. % sulfuric acid.

4. The solution of claim 3 wherein the sulfuric acid is about 3.0 wt. %.

5. The solution of claim 1 wherein the surfactant is an ester.

6. The solution of claim 5 wherein the ester is phosphate acid ester.

7. The solution of claim 1 wherein the nitric acid is about 20 wt. %.

8. The solution of claim 1 wherein the phosphoric acid is about 0.5 wt. %.

9. The solution of claim 1 wherein the hydrogen peroxide is about 3 wt. % of an about 35 percent solution.

10. The solution of claim 1 wherein the surfactant is about 10 wt. %.

11. A method of de-scaling scale-covered surfaces, the method comprising:
   (a) applying a de-scaling solution comprising:
      (i) about 5 wt. % to about 25 wt. % nitric acid;
      (ii) about 0.1 wt. % to about 1 wt. % phosphoric acid;
      (iii) about 0.5 wt. % to about 9 wt. % hydrogen peroxide;
      (iv) about 2 wt. % to about 12 wt. % surfactant; and
      (v) the balance water; to a scale-covered surface; and
   (b) rinsing the surface to remove dissolved scale constituents therefrom.

12. The method of claim 11, wherein the applying comprises applying the de-scaling solution under high pressure.

13. The method of claim 11, wherein the applying comprises immersing the scale-covered surface in the de-scaling solution.

14. The method of claim 11, further comprising scrubbing the surface, after the step of applying a de-scaling solution.

15. The method of claim 11, further comprising scrubbing the surface after the step of rinsing.

16. The method of claim 11, further comprising repeating the step of applying a de-scaling solution, after the step of rinsing.

17. A method of de-scaling scale-covered surfaces, the method comprising:
   (a) applying a de-scaling solution comprising:
      (i) about 5 wt. % to about 25 wt. % nitric acid;
      (ii) about 0.1 wt. % to about 1 wt. % phosphoric acid;
      (iii) about 0.5 wt. % to about 9 wt. % hydrogen peroxide;
      (iv) about 2 wt. % to about 12 wt. % surfactant; and
      (v) the balance water;
      to a scale-covered surface, wherein the scale comprises a hazardous substance; and
   (b) rinsing the-surface to wash dissolved scale constituents and the hazardous substance from the surface.

18. The method of claim 17, wherein the hazardous substance of the scale comprises radionucleides, and the applying and rinsing reduces radionucleide contamination to less than 5,000 DPM.

19. The method of claim 17, wherein the hazardous substance of the scale comprises PCBs, and the steps of applying and rinsing reduces the concentration of PCBs to less than 10 micrograms/100 $cm^2$.

20. The method of claim 17, wherein the de-scaling solution of the applying step further comprises a catalyst selected from iron, chloride, and nickel chloride.

21. The solution of claim 1, further comprising a catalyst selected from iron chloride and nickel chloride.

* * * * *

UNITED STATES PATENT AND TRADEMARK OFFICE
CERTIFICATE OF CORRECTION

PATENT NO. : 5,821,211
DATED : October 13, 1998
INVENTOR(S) : R.E. Borah

Page 1 of 3

It is certified that error appears in the above-indentified patent and that said Letters Patent is hereby corrected as shown below:

COLUMN    LINE

| COLUMN | LINE | | | |
|---|---|---|---|---|
| [56] Pg. 1, col. 1 | Refs. Cited (U.S. Pats.) | insert the following: | | |
| | | --3,437,521 | 04/1969 | Buist |
| | | 3,655,569 | 04/1972 | Hellsten et al. |
| | | 3,832,234 | 08/1974 | Otrhalek et al. |
| | | 3,882,038 | 05/1975 | Clayton et al. |
| | | 3,957,529 | 05/1976 | Alexander et al. |
| | | 4,032,466 | 06/1977 | Otrhalek et al. |
| | | 4,040,866 | 08/1977 | Mondseine |
| | | 4,174,290 | 11/1979 | Leveskis |
| | | 4,376,069 | 03/1983 | Maggi |
| | | 4,390,465 | 06/1983 | Spekman, Jr. |
| | | 4,410,396 | 10/1983 | Somers et al. |
| | | 4,430,128 | 02/1984 | Frenier et al. |
| | | 4,439,339 | 03/1984 | Doumit |
| | | 4,472,205 | 09/1984 | Cortner |
| | | 4,541,945 | 09/1985 | Anderson et al. |
| | | 4,640,719 | 02/1987 | Hayes et al. |
| | | H269 | 05/1987 | Malik |
| | | 4,666,528 | 05/1987 | Arrington et al. |
| | | 4,676,920 | 06/1987 | Culshaw |
| | | 4,749,508 | 06/1988 | Cockrell, Jr. et al. |
| | | 4,762,638 | 08/1988 | Dollman et al. |
| | | 4,767,563 | 08/1988 | de Buzzaccarini |
| | | 4,792,413 | 12/1988 | Nash et al. |
| | | 4,877,459 | 10/1989 | Cockrell Jr. et al. |

UNITED STATES PATENT AND TRADEMARK OFFICE
CERTIFICATE OF CORRECTION

PATENT NO. : 5,821,211
DATED : October 13, 1998
INVENTOR(S) : R.E. Borah

It is certified that error appears in the above-indentified patent and that said Letters Patent is hereby corrected as shown below:

| COLUMN | LINE | | | |
|---|---|---|---|---|
| [56] Pg. 1, col. 1 | Refs. Cited (U.S. Pats.) (continued) | 4,966,724 | 10/1990 | Culshaw et al. |
| | | 5,102,573 | 04/1992 | Han et al. |
| | | 5,122,194 | 06/1992 | Miller et al. |
| | | 5,421,906 | 04/1993 | Borah et al. |
| | | 5,202,050 | 04/1993 | Culshaw et al. |
| | | 5,205,960 | 04/1993 | Kristupeit et al. |
| | | 5,254,290 | 10/1993 | Blandiaux et al. |
| | | 5,290,472 | 03/1994 | Michael |
| | | 5,728,660 | 09/1996 | Borah et al.-- |

[56] Pg. 1, col. 1   Refs. Cited (Other Refs.)   insert the following:

--Connor, Jesse R., "Chemical Fixation and Solidification of Hazardous Wastes," 1990, pp. 36-39; 43; 55; 72-74; 91; 380-381; and 533.

Adamson, Arthur W., "Physical Chemistry of Surfaces," 5th Ed., 1990, pp. 11; 101; 226-227; 229; 379; 421-422; 435; 442-443; 473; 493-495; 506-507; 514-516; 528; 531; and 571.

Rosen, Milton J., "Surfactants and Interfacial Phenomena," 2nd Ed., 1989, pp. 17-19; 31; 55-56; 150, 229; 255; 270-273; and 374-375.

Corbitt, Robert A., "Standard Handbook of Environmental Engineering," pp. 6-20; 9.6; 9.67; 9.87; and 9.100.

Manaham, Stanley E., "Environmental Chemistry," 5th Ed., 1991, pp. 5; 48-49; 57; 59; 67-68; 96-96; 162-163; 172-175; 198; 260-261; 415; 433-434; and 481.

UNITED STATES PATENT AND TRADEMARK OFFICE
CERTIFICATE OF CORRECTION

PATENT NO. : 5,821,211
DATED : October 13, 1998
INVENTOR(S) : R.E. Borah

It is certified that error appears in the above-indentified patent and that said Letters Patent is hereby corrected as shown below:

| COLUMN | LINE | |
|---|---|---|
| [56]<br>Pg. 1, col. 1 | Refs. Cited<br>(Other Refs.)<br>(continued) | Betz, pp. 112; 118-120.<br>"The Nalco Water Handbook," 2nd Ed., pp. 3.19; 11.1; 39.17.<br>McCutcheon's Emulsifiers and Detergents, North American Edition 1982, pp. 283.-- |
| 9<br>(Claim 1, line 8) | 9 | after "water" insert --wherein the pH of the composition is less than 1-- |
| 9<br>(Claim 11, line 9) | 35 | after "water" insert --wherein the pH of the composition is less than 1--, then insert a paragraph return |
| 10<br>(Claim 17, line 9) | 20 | after "water" insert --wherein the pH of the composition is less than 1-- |

Signed and Sealed this

Twenty-eighth Day of November, 2000

Attest:

Attesting Officer

Q. TODD DICKINSON

Director of Patents and Trademarks